United States Patent
Nelms et al.

(10) Patent No.: US 7,290,364 B2
(45) Date of Patent: Nov. 6, 2007

(54) NON-RECTANGULAR SHAPED CREDIT CARD WITH CASE

(75) Inventors: David W. Nelms, Lake Forest, IL (US); Betty M. Schick, Lake Villa, IL (US); Kimberly S. Wilson, Highland Park, IL (US); Roger C. Hochschild, Larchmont, NY (US)

(73) Assignee: Discover Financial Services LLC, Riverwoods, IL (US)

( * ) Notice: Subject to any disclaimer, the term of this patent is extended or adjusted under 35 U.S.C. 154(b) by 818 days.

(21) Appl. No.: 10/085,454

(22) Filed: Feb. 27, 2002

(65) Prior Publication Data
US 2003/0014891 A1 Jan. 23, 2003
US 2005/0257409 A9 Nov. 24, 2005

Related U.S. Application Data

(63) Continuation-in-part of application No. 29/133,861, filed on Dec. 8, 2000, now Pat. No. Des. 457,556.

(60) Provisional application No. 60/306,743, filed on Jul. 20, 2001.

(51) Int. Cl.
G09F 3/20 (2006.01)
(52) U.S. Cl. .......................... 40/649; D19/9
(58) Field of Classification Search ................. 40/608, 40/607.03, 610, 611.01, 612, 649
See application file for complete search history.

(56) References Cited
U.S. PATENT DOCUMENTS

| | | | |
|---|---|---|---|
| 1,063,577 A * | 6/1913 | Moran ........................ 40/492 |
| 3,242,959 A | 3/1966 | Glass ......................... 150/39 |
| 3,606,777 A | 9/1971 | Watson ....................... 70/458 |
| 3,650,210 A | 3/1972 | Archer ....................... 101/369 |
| 3,838,252 A | 9/1974 | Hynes et al. ........ 235/61.12 M |
| 4,100,011 A | 7/1978 | Foote ......................... 156/272 |
| 4,739,877 A | 4/1988 | Olson ....................... 206/38.1 |
| 4,829,690 A | 5/1989 | Andros ....................... 40/642 |
| D302,074 S | 7/1989 | Halasz ......................... D3/62 |

(Continued)

FOREIGN PATENT DOCUMENTS

CA 2300241 3/2000

(Continued)

OTHER PUBLICATIONS

PCT Search Report in corresponding International Application No. PCT/US02/22933, mailed Oct. 21, 2002.

(Continued)

*Primary Examiner*—Cassandra Davis
(74) *Attorney, Agent, or Firm*—Leydig Voit & Mayer, Ltd.

(57) ABSTRACT

A non-rectangular or asymmetrically shaped credit card or phone card with an associated case or holder. The card has a configuration that complements the configuration of the case so that the card is easily removed from the holder for access, yet is maintained inside the case in a covered position and is protected from abuse. The case is designed to be light-weight and easily carried and to serve as a device to carry the card in a safe and convenient manner outside of a wallet or purse. Alternatively, the card may be in an I-shape or square shape configuration.

38 Claims, 3 Drawing Sheets

U.S. PATENT DOCUMENTS

| | | | |
|---|---|---|---|
| 5,020,255 A | 6/1991 | Rodel | 40/654 |
| D322,816 S * | 12/1991 | Immerman | D20/28 |
| D324,305 S | 3/1992 | Prey | D3/56 |
| 5,217,056 A | 6/1993 | Ritter | 150/147 |
| 5,499,293 A * | 3/1996 | Behram et al. | 705/76 |
| 5,520,230 A | 5/1996 | Sumner, III | 150/147 |
| D372,358 S | 8/1996 | Mathison | D3/247 |
| D381,499 S | 7/1997 | Campbell | D3/212 |
| 5,718,329 A | 2/1998 | Ippolito et al. | 206/38 |
| D396,882 S * | 8/1998 | Neal, Jr. | D19/10 |
| D411,765 S | 7/1999 | Holihan | D3/247 |
| D419,289 S | 1/2000 | Edwards | D3/208 |
| 6,011,677 A | 1/2000 | Rose | 360/133 |
| 6,155,410 A | 12/2000 | Davis | 206/39.5 |
| D436,991 S | 1/2001 | Morgante | D19/9 |
| 6,202,933 B1 | 3/2001 | Poore et al. | 235/493 |
| 6,224,109 B1 | 5/2001 | Yang | 283/77 |
| 6,248,199 B1 | 6/2001 | Smulson | 156/244.12 |
| 6,298,336 B1 | 10/2001 | Davis et al. | 705/41 |
| D453,160 S | 1/2002 | Pentz et al. | D14/436 |
| D453,161 S | 1/2002 | Pentz | D14/436 |
| D453,336 S | 2/2002 | Pentz et al. | D14/436 |
| D453,337 S | 2/2002 | Pentz et al. | D14/436 |
| D453,338 S | 2/2002 | Pentz et al. | D14/436 |
| D453,339 S | 2/2002 | Pentz | D14/436 |
| D453,516 S | 2/2002 | Pentz | D14/436 |
| D453,517 S | 2/2002 | Pentz | D14/436 |
| D456,814 S | 5/2002 | Pentz | D14/436 |
| D457,556 S | 5/2002 | Hochschild | D19/9 |
| 6,402,028 B1 | 6/2002 | Graham, Jr. et al. | 235/380 |
| D460,454 S | 7/2002 | Pentz | D14/436 |
| D460,455 S | 7/2002 | Pentz | D14/436 |
| D462,965 S | 9/2002 | Pentz | D14/436 |
| D462,966 S | 9/2002 | Pentz et al. | D14/436 |
| 6,471,127 B2 | 10/2002 | Pentz et al. | 235/487 |
| 6,484,940 B1 * | 11/2002 | Dilday et al. | 235/454 |
| D470,657 S | 2/2003 | Kawamura | D3/247 |
| D474,234 S | 5/2003 | Nelms et al. | D19/9 |
| 7,065,195 B1 * | 6/2006 | Smith et al. | 379/144.01 |
| 2001/0038033 A1 * | 11/2001 | Habib | 235/375 |
| 2001/0042009 A1 * | 11/2001 | Montague | 705/14 |
| 2002/0027040 A1 * | 3/2002 | Sato et al. | 181/167 |
| 2002/0027837 A1 * | 3/2002 | Weber | 369/14 |
| 2002/0092914 A1 | 7/2002 | Pentz et al. | 235/487 |

FOREIGN PATENT DOCUMENTS

| | | |
|---|---|---|
| DE | 298 02 638 U1 | 6/1998 |
| DE | 298 12 046 U1 | 11/1998 |
| EP | 0 379 921 A1 | 1/1990 |
| EP | 0515327 A1 | 11/1992 |
| EP | 1 221 518 A2 | 7/2002 |
| FR | 2 794 059 | 12/2000 |
| JP | 2000-113136 A1 | 4/2000 |
| WO | WO98/16908 | 4/1998 |
| WO | WO 02/067190 A2 | 8/2002 |

OTHER PUBLICATIONS

Wolfgang Rankl, "Handbuch Der Chipkarten: Aufbau, USW", Handbuch Der Chipkarten, Aufbau-Funktionsweise-Einsatz Von Smart Cards, Muenchen: Carl Hanswer Verlag, DE, 1999, pp. 44-47, 56-61, 68-71 (with translation).

U.S. Appl. No. 09/611,320, filed Jul. 6, 2000, Collins et al.
U.S. Appl. No. 60/263,756, filed Jan. 25, 2001, Pentz et al.
Collins et al., U.S. Appl. No. 09/611,320, filed Jul. 6, 2000.
Pentz et al., U.S. Appl. No. 60/263,756, filed Jan. 25, 2001.
Hochschild, U.S. Appl. No. D. 457,556 S, issued May 21, 2002.
Canadian Published Application No. 2,300,241 (Weatherford), published Mar. 8, 2000.

* cited by examiner

NON-RECTANGULAR SHAPED CREDIT CARD WITH CASE

This application claims the benefit under 35 U.S.C. §119 (e) of U.S. Provisional Application Ser. No. 60/306,743, filed Jul. 20, 2001, which is incorporated herein by reference. This application also claims the benefit under 35 U.S.C. § 120 of and is a continuation-in-part of application Ser. No. 29/133,861, filed Dec. 8, 2000, now issued U.S. Pat. No. D457,556.

BACKGROUND OF THE INVENTION

The present invention relates to a credit card of non-rectangular configuration, preferably of asymmetrical shape, that has an associated case that is accessed in a variety of ways, such as on a key chain, clipped to an accessory such as a belt or clothing, or kept in a pocket or bag. The case is configured to hold the credit card, as well as other types of magnetic stripe or barcode cards, such as telephone and stored value cards.

Special value cards have been provided by grocery, pet supply and other merchant stores in the form of cards with key loops or key chain attachment features. The advantage of having the card accessible outside of a wallet or purse, such as on a key chain, is that the user has the card available at his or her fingertips instead of having to open a purse or wallet. Having the card in the accessed position increases the likelihood of usage of the card, in contrast to requiring the user to remove the card from a wallet and/or purse and make a choice to use a particular card from among several possible choices.

Special value cards are typically limited to providing discounts or loyalty points at the checkout point of a retail store. The user provides the card to the clerk who swipes the card through a magnetic stripe reader, or reads the barcode with a barcode scanner, and the user is provided with discounts on items that have been purchased and entered into the register, or provides an overall discount of a set percentage. Special value cards also indicate that the user has made a purchase of a certain amount, which is often stored in a central memory by the retailer, and the user is provided with further discounts and/or awards upon reaching certain levels of purchases.

If the special value card is lost or stolen, its use is of very limited value to the person who obtains the card. Unlike a credit card, which can be used to make purchases on credit at a store, the stored value card typically only provides discounts and purchase amount accumulations for awards. Thus, the user of the card is typically not concerned with showing the card in the open to others, as the risk of theft is minimal. Moreover, the abuse and wear and tear on the special value card is of limited concern because the cards can be easily replaced and have a limited lifetime.

As noted above, having the card already accessed and in a useable position outside of a wallet and/or purse is advantageous for the card supplier as it enhances the opportunities for use of the card. Accordingly, suppliers of conventional credit cards desire the advantages of having their particular card in the accessed position and outside of the wallet or purse. In the case of a conventional credit card, the user typically carries a number of such cards and has a choice among cards for use. For example, the user may often choose from one or more bank issued credit cards in multiple accounts or from a particular department store or other branded card. Thus, the supplier of the conventional credit card would obtain an advantage over other conventional credit cards by having the card in the accessed position, in contrast to the other cards being maintained in the wallet or purse.

Having a standard credit card in the accessed position, such as on a key chain in the same manner as a stored value card, presents additional problems. First, conventional credit cards are the target of theft of not only the card itself, but the card number printed on the card. Thus, having the credit card in the open, such as on the end of a key chain, presents a target for card thieves. Second, conventional credit cards are expected to have a longer life than a stored value card. Having the conventional credit card in the accessed position on a key chain would subject the card to substantial abuse and wear and tear, which will require more frequent replacement, or cause malfunctioning of aspects of the card, such as the magnetic stripe, or cause an identification photograph to be defaced or marred.

Additionally, the size and shape of a conventional credit card makes it disadvantageous to carry for special uses such as on a key chain attachment. The rectangular shape and conventional size requires an equally large sized container or holder to cover the card. The rectangular shape also limits the options for container size and shape and access to the card within a case. Key chain containers are inherently limited in size and weight in order to promote their use. Bulky or excessively large key chain holders will pull the key when used in a car ignition, or add weight or size to an item that is typically carried in a pocket or a purse.

Standard credit card magnetic stripe readers are designed to receive a rectangular shaped card with at least one edge that is flat or substantially straight. The cards are designed with at least one edge that is straight and parallel to the direction of the encoding on the magnetic stripe. The edge of the card serves as a reference for the stripe reading heads, which are located a specified distance from the base, or the same distance from the edge of the card to the location of the magnetic stripe. Moreover, the magnetic stripe has a specified length and width in order to record a particular number of tracks of recorded data. These standards for card sizes and shapes and magnetic stripe specification provide disincentives for modification of the physical features of credit cards and the associated stripe. The present invention provides an unconventionally, or non-rectangular, shaped credit card, and an associated case, that still allows usage with a standard magnetic stripe card reader.

SUMMARY OF THE INVENTION

The present invention provides a credit card and associated case or holder. The card has a configuration that complements the configuration of the case so that the card is easily removed from the holder for access, yet is maintained inside the case in a covered position and is protected from abuse. The case is designed to be light-weight and easily carried.

In one or more embodiments, the card is a credit card. The card has a first end with at least one arcuate portion formed of a first radius. The card has a second end with at least one arcuate portion formed of a second radius. In one or more embodiments, the shape of the card is asymmetric about a vertical centerline with one end being of less width than the other end. The difference in end widths is accomplished by having the second end radius being less than the first end radius. In one or more embodiments, the shape of the card is asymmetric about a horizontal centerline. In one or more embodiments, the card is symmetrical about a vertical and/or horizontal centerline, but is of non-rectangular shape. In another embodiment, the card is square in shape, and smaller than a conventionally sized card.

The card also has a first card connecting portion on a first side, or upper edge, of the card between the first end and the second end. The first card connecting portion has at least one convex portion along the upper edge between the first and second ends. The card also has a second card connecting portion on a second side, or lower edge, of the card between the first end and the second end. The second card connecting portion has at least one concave portion along the lower edge.

In one or more embodiments, the case is formed in two portions, or upper and lower cover portions. Each of the upper and lower cover portions has a first end with an arcuate portion formed of a first radius and a second end with an arcuate portion formed of a second radius. Additionally, each of the upper and lower cover portions have a first cover connecting portion on a first side of the cover portion between the first cover end and the second cover end. The first cover connecting portion has a concave portion along the edge. Additionally, each of the upper and lower cover portions have a second cover connecting portion on a second side of the cover portion between the first cover end and the second cover end. The second cover connecting portion has a convex edge.

The card is interposed between the upper cover portion and the lower cover portion. The card is movable between said upper and lower cover portions from a closed position in which a majority of the upper surface area of the card is enclosed by the cover portions to an open position in which a majority of the lower surface area of the card is exposed from cover portions to permit access to the card. In other words, in the closed position, at least a majority of the surface area of the card is enclosed within the cover portions or case portions in order to protect the card and keep the identification information on the card out of visual view. In the open position a majority of the surface area of the card is exposed so that the card can be dragged through a card reader without having to completely detach or remove the card from the case. When in the closed position, the convexly curved portion along the edge of the card extends outward from the concavely curved portion along the edge of the cover so that the card can be easily accessed by the user.

In one or more embodiments, the card is pivotally connected to the upper and lower cover portions. The card is detachable or removable from the pivotal connection to the upper and the lower cover portions, in order to be fully removed from the case. The card preferably has a knurled opening with an open end for the pivotal connection to the upper and lower cover portions. Other types of cutouts or formations may be used to obtain the pivotal connection. The knurled opening includes a substantially circular portion to permit pivotal rotation of the card relative to the upper and lower cover portions.

The upper and lower case portions and the card may be thin, elongated members formed of a plastic substrate, such as where the card is a plastic credit card. The card may also be formed of a paper substrate, such as when the card is a telephone card or other stored value card. One or more cards may be placed within the case, depending on the structure of the case.

DETAILED DESCRIPTION OF THE PREFERRED EMBODIMENTS

The present invention provides a non-rectangular, and preferably an asymmetrical, shaped credit card with an associated case or holder. The card is formed of a configuration that complements the configuration of the case so that the card is easily removed from the holder for access, yet is maintained inside the case in a covered position and is protected from abuse. The case is designed to be lightweight and easily carried, which is an important feature in order to attach the cover to a variety of items, such as a key chain. The case is preferably configured in a clam-shell type shape so that the card may be rotated into and out of the holder. The case may also be of a sufficient size to include other small items, such as a microprocessor or chip.

In one or more embodiments, the present invention provides a card and case that includes a card for use with an electronic payment mechanism. The term "electronic payment mechanism" is intended to include conventional credit card readers and magnetic stripe readers, in addition to any other type of mechanism that can be used with a card to transfer payment information. Other types of mechanisms can include, without limitation, barcode scanners and readers, phone card readers, debit card readers, bank ATM card readers, or personal computers or hand-held devices that can be used in conjunction with such cards to make payments electronically by inputting card identification information, alone or in conjunction with other identification means.

In one or more embodiments, the card is a credit card, such as offered by Discover Financial Services (or VISA, MasterCard, American Express, or various retail establishments). The card has an upper surface and a lower surface. Each of those surfaces define a surface area on oppositely oriented front and back faces of the card. Typically, card holder information, such as card number, card holder name, card expiration date, issuer name, issuer logo, and the like, are included on the upper surface. Typically, the lower surface of the card includes a magnetic stripe, which has tracks of magnetically coded information relating to the card holder and the issuer. The information on the stripe is typically accessed by dragging the card through an associated magnetic stripe reader that has heads for reading the stripe. Associated magnetic stripe reader is meant to include, without limitation, all types of magnetic stripe reading mechanisms, such as those typically found at retail establishments. Modifications may need to be made to the card to accommodate certain types of magnetic stripe readers.

Figure 1:
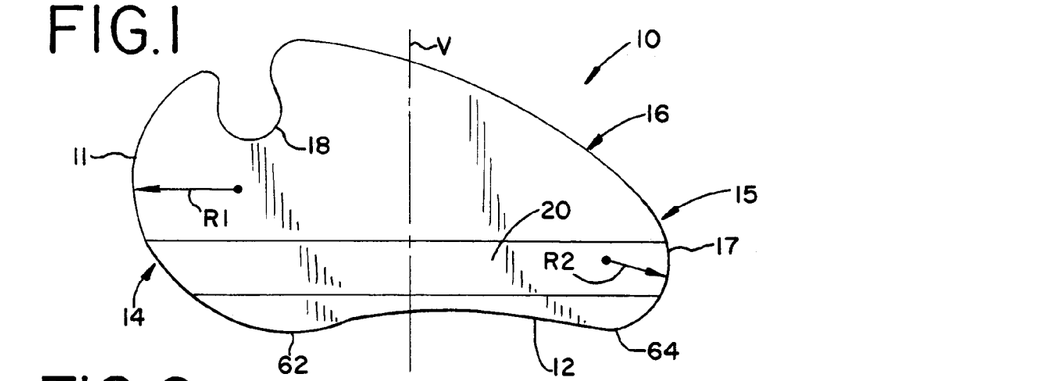
FIG. 1 is a top plan view of one embodiment of the card of the present invention.

As shown in FIG. 1, the card 10 has a first card end 11 with at least one arcuate portion 14 formed of a first card radius, R1. The card 10 has a second card end 15 with at least one arcuate portion 17 formed of a second card radius R2. In one preferred embodiment, the shape of the card is asymmetric about a vertical centerline V, with one end 15 being of less width than the other end 11. The difference in end widths is formed by having the second card radius R2 being less than the first card radius R1.

The card also has a first card connecting portion 16 on a first side, or upper edge, of the card between the first end 11 and the second end 15. The first card connecting portion 16 has at least one convexly curved portion 48, or a convex portion, along the upper edge between the first and second ends, shown more clearly in FIG. 4. The card also has a second card connecting portion 12 on a second side, or lower edge, of the card between the first end and the second end. The second card connecting portion has at least one concavely curved portion 50, or a concave portion, along the lower edge, also shown in FIG. 4.

While such terms as upper edge, lower edge, first end and second end are used herein, the invention is to be broadly construed to include placement of various features on upper or lower or first or second ends or sides without restriction to the particular embodiments described herein. Also, the terms convex and concave are intended to describe the outward or inward curve or arc of the segment.

Figure 2:
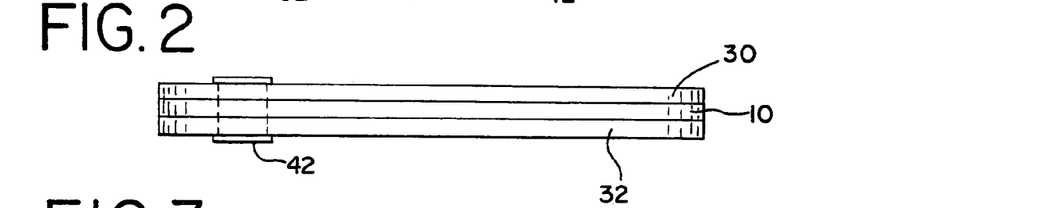
FIG. 2 is a side view of one embodiment of the card and case of the present invention.
Figure 3:
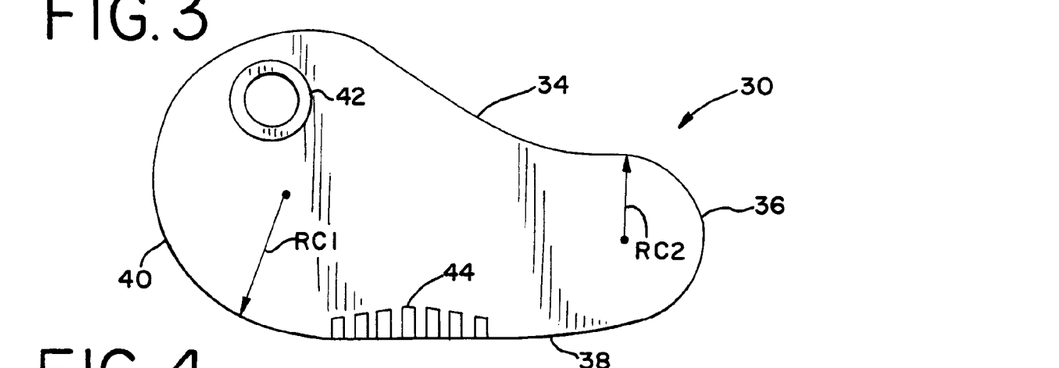
FIG. 3 is a top plan view of one embodiment of the cover of the case of the present invention.

In one embodiment, as shown in FIGS. 2 and 3, the case is formed in two portions, or upper and lower cover portions 30, 32. Each of the upper and lower cover portions has a first cover end 40 with at least one arcuate portion formed of a first cover radius RC1 and a second cover end 36 with at least one arcuate portion formed of a second cover radius RC2. Additionally, each of the upper and lower cover portions have a first cover connecting portion 34 on a first side of the cover portion between the first cover end 40 and the second cover end 36. The first cover connecting portion 34 has at least one concavely curved portion, or a concave portion along the edge. Additionally, each of the upper and lower cover portions 30, 32 have a second cover connecting portion 38 on a second side of the cover portion between the first cover end 40 and the second cover end 36. The second cover connecting portion 38 has at least one convexly curved portion, or convex edge.

Figure 4:
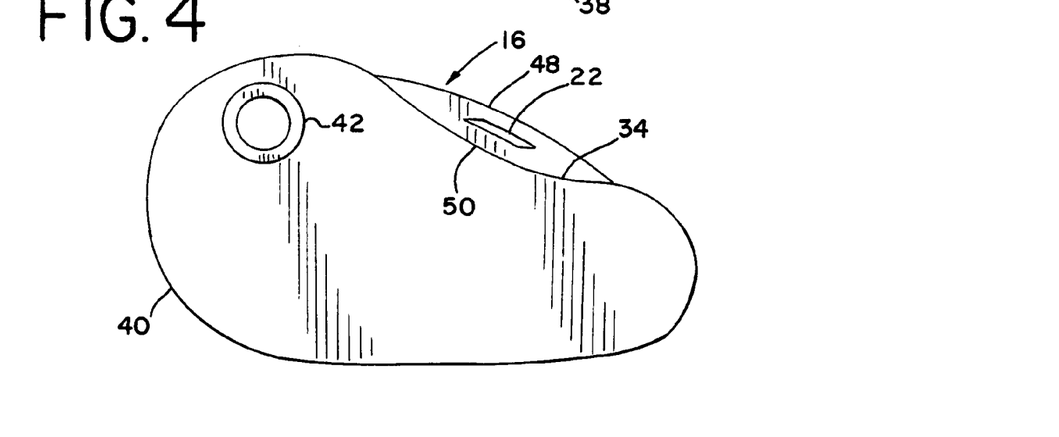
FIG. 4 is a top plan view showing the card in the fully closed position within the case.
Figure 5:
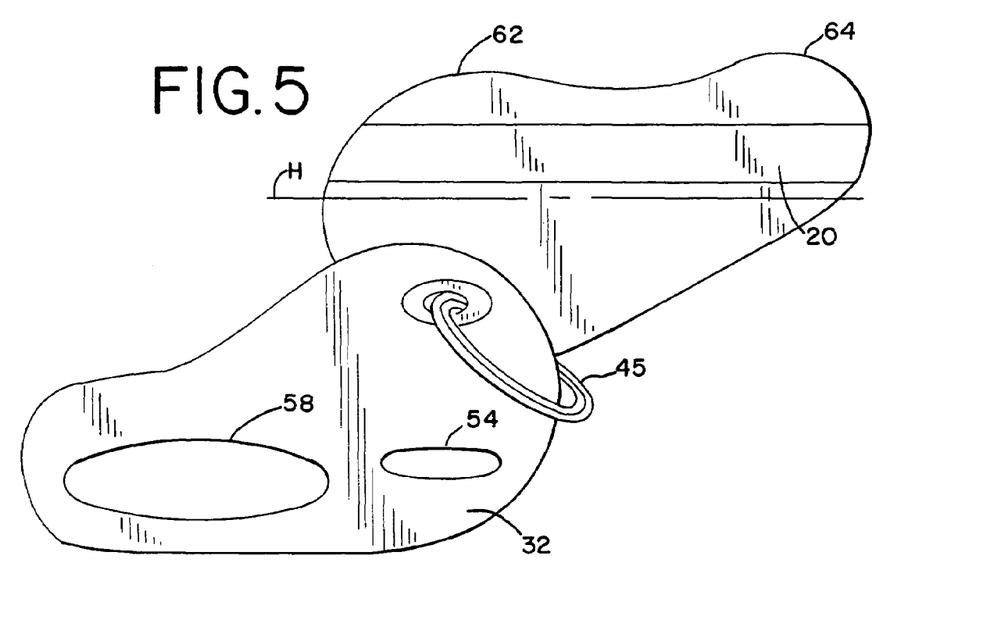
FIG. 5 is a perspective view showing one embodiment of the lower surface of the card and the lower portion of the case of the present invention in the fully open position.
Figure 6:
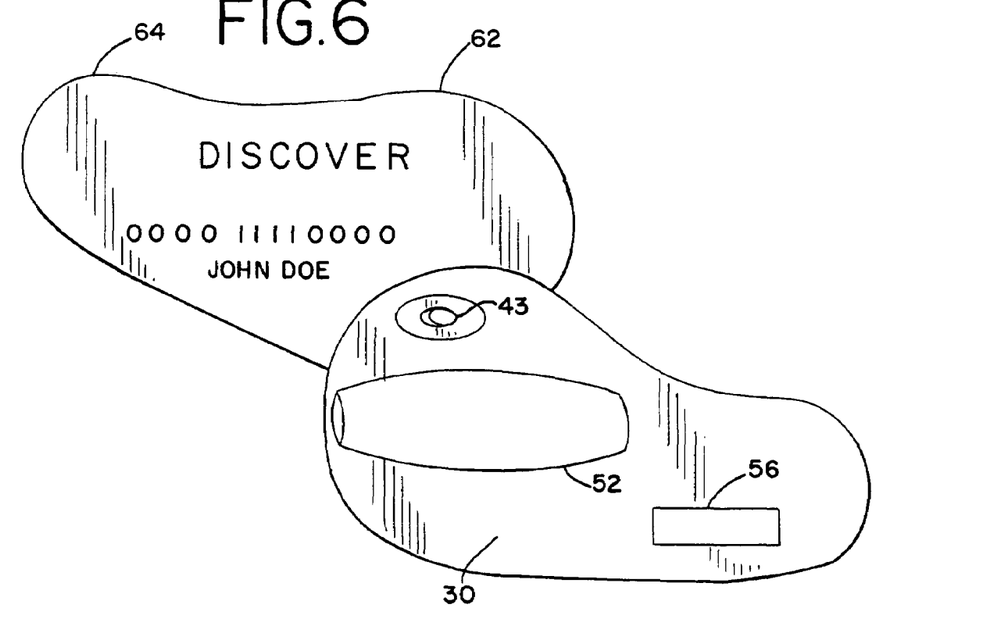
FIG. 6 is a perspective view showing one embodiment of the upper surface of the card and the upper portion of the case of the present invention in the fully open position.

The card 10 is interposed between the upper cover portion 30 and the lower cover portion 32. The card is movable between said upper and lower cover portions from a closed position in which a majority of the upper surface area of the card is enclosed by the cover portions to an open position in which a majority of the lower surface area of the card is exposed from cover portions to permit access to the card. In other words, in the closed position, as shown in FIG. 4, at least a majority of the surface area of the card is enclosed within the cover portions or case portions in order to protect the card and keep the identification information on the card out of plain view. In the open position, as shown in FIGS. 5 and 6, a majority of the surface area of the card is exposed so that the card can be dragged through a card reader without having to completely detach or remove the card from the case.

In one embodiment, the card is pivotally connected to the upper and lower cover portions. The card is detachable or removable from the pivotal connection to the upper and the lower cover portions, in order to be fully removed from the case. The card preferably has a knurled opening 18 with an open end for the pivotal connection to the upper and lower cover portions. Other types of cutouts or formations may be used to obtain the pivotal connection. The knurled opening 18 includes a substantially circular portion to permit pivotal rotation of the card relative to the upper and lower cover portions.

The pivotal connection may be formed by a pivot pin 42 connecting the upper and lower portions. The pin may be in the form of a generally cylindrically shaped rivet. The rivet or pin may also have an aperture 43 formed therein to permit passage of a key chain loop 45. This allows the attachment of keys to the case to permit the key chain aspect of the case to be accomplished.

In one embodiment, the shape of the first cover end 40 of the first cover radius RC1 forms a rounded portion of the arcuate portion for at least 180 degrees. In other words, the radius forms a semicircle along the end at a portion of the end. The end of the semicircle then blends smoothly into the concave curvature of the first cover connecting portion 34. Similarly, the convex curvature 38 of the second cover connecting portion blends smoothly into the rounded portion of the first end.

At the other end, the second cover end 36 of the second cover radius RC2 may form a rounded portion of the arcuate portion for at least 180 degrees, or a semicircle along the second end portion 36. The concave curvature of the first cover connecting portion blends 34 smoothly into this rounded portion of the second end 36. Similarly, the convex curvature of the second cover connecting portion 38 blends smoothly into the rounded portion of the second end 34.

In one preferred embodiment, the convex portion 48 of the upper surface of the first card connecting portion 16 of the card extends outside the concave portion 50 of the first cover connecting portion 34 of the cover when the card is enclosed within the cover portions in the closed position. Preferably, the upper and lower cover or case portions form a matching set and the credit card rotates from within the matched case portions to an outside or accessed position, and then rotates back to a closed position after use. The shape of the case portions and card portions allows access to the card from the closed position to permit easy rotation or removal of the card from the case.

In one embodiment, the upper case portion includes a money clip member 52 attached thereto for holding currency against upper case portion. A clip member 52 may also be included for attachment of the case to an article of clothing, or to another accessory, such as the inside of a brief case pocket or purse pocket.

The lower case portion may also include a microprocessor chip 54 embedded therein. The microprocessor chip communicates with an associated electronic payment mechanism by a radio signal transmitted therebetween. A radio-frequency identification (RFID) system, such as those used at gasoline and retail systems with a hand-held wand or "fob," is contemplated for use with this chip. In one embodiment, the radio signal causes communication with an associated electronic payment mechanism and identification of information associated with the particular credit card used with this case. The electronic payment mechanism causes transmission of information relating to information contained on the card.

At least one of the upper and lower case portions may include identification information 56 associated with the card. For example, information related to the issuer of the credit card may be placed on the outside of the case. The lower case portion may include at least one or more labels 58 having bar coded information thereon. Preferably, the bar code information is associated with information contained on the credit card. Barcode information may be added by placement of a label with adhesive on the outside of the case.

In another embodiment, the bar code labels on the case are not necessarily associated with the information contained on the credit card, but may be associated with one or more merchant loyalty programs. The case of the present invention thus provides a device with multiple, or a plurality of, bar codes on a single device. The bar code labels can be updated or modified by applying additional adhesive-backed labels over the existing labels.

The upper and lower case portions and the card may be thin, elongated members formed of a plastic substrate, such as where the card is a plastic credit card. The card may also be formed of a paper substrate, such as when the card is a telephone card or other stored value card, or of other suitable materials. One or more cards may be placed within the case, depending on the structure of the case.

The card may be formed by a punching operation from a standard sized card. Conventional cards are formed by combining a series of substrates, or layers, with a series of one or more coating or clear plastic overlays. One common form of credit card is formed by utilizing a core stock of material such as polyvinyl chloride acetate (PVCA) having opaque agents and plasticizers mixed in the polymer matrix. The core stock is the layer on which the words and symbols are printed, and numbers are embossed. A surface laminate of polyvinyl chloride or PVCA is used to provide a surface finish. The magnetic stripe is applied to the laminate under a hot stamping process that uses heat and pressure.

The cards are then punched out in their conventional rectangular form from a sheet or strip. The present invention contemplates punching the asymmetrically shaped cards from the sheet or strip, or punching the asymmetrically shaped cards from conventionally shaped rectangular cards in a second punching operation. The asymmetrical shape will allow reductions in the amount of materials used for each of the individual cards based on the smaller size of the card. Also, the fonts on the front side of the card, and the magnetic stripe on the back side of the card, are in a condensed format for the smaller sized, asymmetrical shaped cards. Examples of fonts for the user's name, card number, and card issuer name are shown on the card in FIG. 6. The cards can be formed in any size, including a conventional credit card size, or a smaller size, such as approximately two-thirds of the conventional size.

The upper case portion may include a coarse material or embossment on at least a portion of its surface to create a frictional resistance to assist pivotal movement of the case portions with respect to the card. The coarse material may be ridges 44 formed on the surface. The card may include a recessed portion 22, such as a fingernail slot, on its upper surface to assist pivotal movement of the card with respect to the cover portions. However, the preferred embodiment does not include any recessed portion or slot.

In the embodiments of a credit card or a phone card, the card may include a magnetic stripe 20 that contains information relating to the card. The magnetic stripe extends between the arcuate first card end 14 and the arcuate second card end 17. The magnetic stripe information is formed on tracks on the stripe between the arcuate first card end and the arcuate second card end. The magnetic stripe of the present invention may use an ISO standard magnetic stripe that has non-ISO standard data, or compressed data, or may use ISO standard data. The compression of data on the stripe is necessary as a result of the stripe length on the asymmetrical card being less than the length of a conventional magnetic stripe on a conventional rectangular card. However, the non-ISO standard data, or compressed data, can be read in a standard magnetic stripe reading machine.

The card also has a second card connecting portion 12 that extends between two points 62, 64 formed on the lower surface of the card. These two points 62, 64 form a line therebetween that is substantially parallel to the magnetic stripe 20. The two points form contact points for the card in an associated magnetic stripe reader. The stripe 20 is shown on the upper surface of the embodiment in FIG. 1, for illustrative purposes. The stripe is typically on the lower or bottom surface, as shown in FIG. 5. Also shown in FIG. 5 is the horizontal centerline H, about which the card is asymmetrically formed.

Figure 7A:
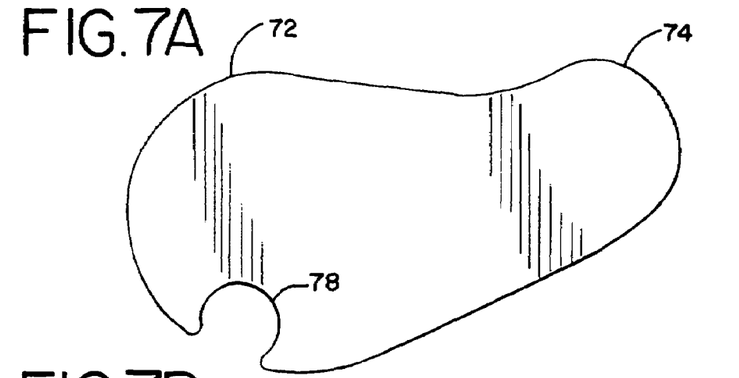
FIG. 7A is a top plan view of another embodiment of the card of the present invention; and, FIG. 7B is a bottom plan view of the embodiment of the card of FIG. 7A.
Figure 7B:
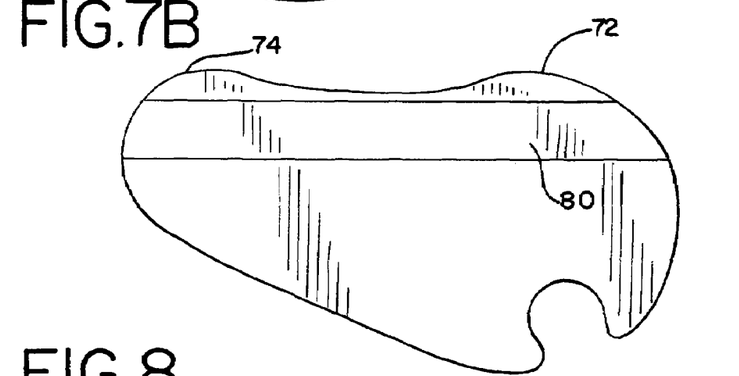

FIGS. 7A and 7B show an alternative embodiment in which the top side is reversed from that in FIG. 6. The two points 72, 74 are formed on the lower surface of the card for location of the card in the reader for reading the magnetic stripe 80. One feature of the embodiment of FIGS. 7A and 7B is that the magnetic stripe is matched to the back of the case when the card is in the associated case. Opening 78 in the embodiment of FIG. 7A provides a greater access portion than the other embodiments shown.

The card of the present invention differs from a conventional credit card in that, among other things, it is asymmetrical in shape with respect to a vertical centerline V along the upper and lower surface. The asymmetrical shape can be in the form of the preferred embodiment in which the two ends are arcuate in shape, with one end being of greater width or size than the other end. Other asymmetrical shapes and configurations for the card are possible and considered within the scope of the present invention.

Figure 8:
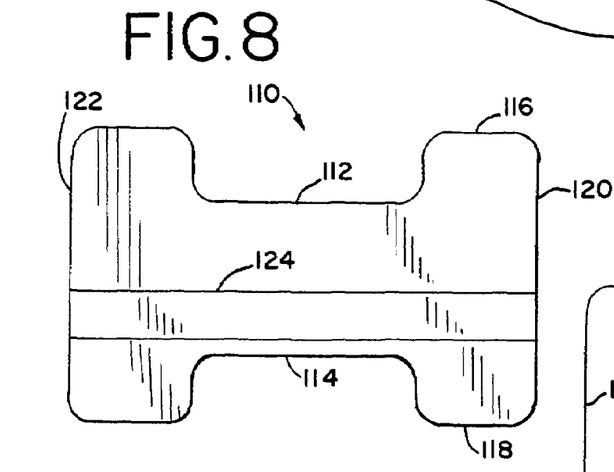
FIG. 8 is a top plan view of another embodiment of the card of the present invention in which the card is symmetric about a centerline and non-rectangular in shape.

FIG. 8 shows another alternative embodiment of the present invention. In FIG. 8, card 110 is preferably of the conventional size, but is shaped in a configuration that differs from the conventional rectangular configuration. The distance between edges 112 and 114 is less than the distance between outside edges 116 and 118 to form a dumbell or I-shape. The card is preferably symmetric about a horizontal centerline and a vertical centerline, but may be asymmetrical about one or both centerlines. The edges 112, 114, 116 and 118 are preferably straight and at 90 degree angles to side edges 120, 122, but may be sloping or curved. The corners of the card between outside edges 116, 118 and side edge 120 are slightly rounded or curved in the conventional manner. A magnetic stripe 124 is shown on the card 110, but may not be included, as shown in some of the other embodiments of the invention.

Figure 9:
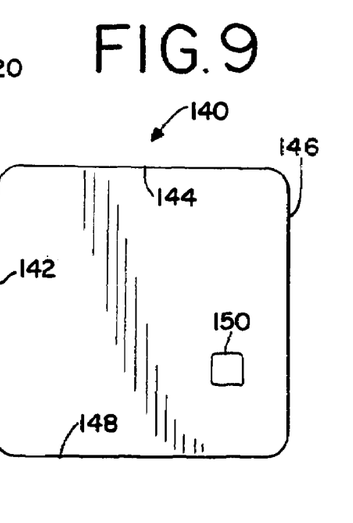
FIG. 9 is a top plan view of another embodiment of the card of the present invention in which the card is symmetric about a centerline and square in shape.

FIG. 9 shows another alternative embodiment of the present invention. In FIG. 9, card 140 is preferably about one-half of the conventional size, but is shaped in a configuration that differs from the conventional rectangular configuration. Preferably, the card is square, or nearly square, which means that the edges 142, 144, 146 and 148 are all nearly equal in length. Instead of a conventional magnetic strip, the card 140 preferably uses a microprocessor chip 150 to transmit identification information to an associated reader. The card 140 is preferably symmetric about horizontal and vertical centerlines, but may be slightly asymmetric about one or both centerlines.

The cards 110 and 140 of FIGS. 8 and 9 may be used with an appropriately constructed case, as shown in some of the other embodiments of the invention. Identification information, such as bar code labels, may also be used with these cards 110, 140.

While one or more preferred embodiments have been identified, other configurations and modifications can be provided which are within the scope of the present invention.

What is claimed is:

1. An asymmetrical shaped card and case, comprising:
   a card for use with an electronic payment mechanism, said card having an upper surface and a lower surface, each of said surfaces defining a surface area on oppositely oriented front and back faces of said card,
   said card having a first card end with at least one arcuate portion formed of a first card radius, said card having a second card end with at least one arcuate portion formed of a second card radius, said second card radius being less than said first card radius,
   said card having a first card connecting portion on a first side of said card between said first end and said second end, said first card connecting portion having at least one convexly curved portion, said card having a second card connecting portion on a second side of said card between said first end and said second end, said second card connecting portion having at least one concavely curved portion,
   a case having upper and lower cover portions, each of said upper and lower cover portions having a first cover end with at least one arcuate portion formed of a first cover radius and a second cover end with at least one arcuate portion formed of a second cover radius,
   each of said upper and lower cover portions having a first cover connecting portion on a first side of said cover portion between said first cover end and said second cover end, said first cover connecting portion having at least one concavely curved portion, each of said upper and lower cover portions having a second cover connecting portion on a second side of said cover portion between said first cover end and said second cover end, said second cover connecting portion having at least one convexly curved portion,
   said card being interposed between said upper cover portion and said lower cover portion, said card being movable between said upper and lower cover portions from a closed position in which a majority of the upper surface area of said card is enclosed by said cover portions to an open position in which a majority of the lower surface area of said card is exposed from cover portions to permit access to said card.

2. The card and case of claim 1, wherein said card is pivotally connected to said upper and said lower cover portions.

3. The card and case of claim 2 wherein said card is removable from said pivotal connection to said upper and said lower cover portions.

4. The card and case of claim 3 wherein said card has a knurled opening with an open end for said pivotal connection to said upper and said lower cover portions.

5. The card and case of claim 4 wherein said knurled opening includes a substantially circular portion to permit pivotal rotation of said card relative to said upper and lower cover portions.

6. The card and case of claim 2 wherein said pivotal connection is formed by a pivot pin connecting said upper and lower portions.

7. The card and case of claim 6 wherein said pivotal connection is formed by a generally cylindrically shaped rivet.

8. The card and case of claim 6 wherein said pin has an aperture therein to permit passage of a key chain loop.

9. The card and case of claim 8 wherein said concave curvature of said first cover connecting portion blends smoothly into said rounded portion of said first cover end.

10. The card and case of claim 8 wherein said convex curvature of said second cover connecting portion blends smoothly into said rounded portion of said first end.

11. The card and case of claim 1 wherein said first cover end of said first cover radius forms a rounded portion of said arcuate portion for at least 180 degrees.

12. The card and case of claim 1 wherein said second cover end of said first cover radius forms a rounded portion of said arcuate portion for at least 180 degrees.

13. The card and case of claim 12 wherein said concave curvature of said first cover connecting portion blends smoothly into said rounded portion of said second end.

14. The card and case of claim 12 wherein said convex curvature of said second cover connecting portion blends smoothly into said rounded portion of said second end.

15. The card and case of claim 1 wherein said convex portion of said upper surface of first card connecting portion of said card extends outside said concave portion of said first cover connecting portion of said cover when said card is enclosed within said cover portions in said closed position.

16. The card and case of claim 1 wherein said upper case portion includes a clip member attached thereto for holding currency against said upper case portion.

17. The card and case of claim 1 wherein said upper case portion includes a clip member attached thereto for attachment of said case to another item.

18. The card and case of claim 1 wherein said lower case portion includes a microprocessor chip embedded therein.

19. The card and case of claim 18 wherein said microprocessor chip communicates with an associated electronic payment mechanism by a radio signal transmitted therebetween.

20. The card and case of claim 19 wherein said radio signal causes communication with said associated electronic payment mechanism and identification of information associated with said card, said electronic payment mechanism causing transmission of information relating to information contained on said card.

21. The card and case of claim 1 wherein at least one of said upper and lower cover portions includes bar code information associated with said card.

22. The card and case of claim 1 wherein said case includes a plurality of labels having bar coded information thereon.

23. The card and case of claim 1 wherein said upper and lower case portions and said card are thin, elongated members formed of a plastic substrate.

24. The card and case of claim 23 wherein said upper cover portion includes a coarse material on at least a portion of its surface to create a frictional resistance to assist pivotal movement of said cover portions with respect to said card.

25. The card and case of claim 24 wherein said coarse material comprises ridge portions formed on said surface.

26. The card and case of claim 1 wherein said upper and lower cover portions are thin, elongated members formed of a plastic substrate and said card is a thin, elongated member formed of a paper substrate.

27. The card and case of claim 1 wherein said card includes a recessed portion on its upper surface to assist pivotal movement of said card with respect to said cover portions.

28. The card and case of claim 1 wherein said lower surface of said card includes a magnetic stripe that contains information relating to said card.

29. The card and case of claim 28 wherein said magnetic stripe extends between said arcuate first card end and said arcuate second card end, said magnetic stripe information being held on said stripe between said arcuate first card end and said arcuate second card end.

30. The card and case of claim 28 wherein said second card connecting portion extends between two points formed on said lower surface of said card, said two points forming a line therebetween that is substantially parallel to said magnetic stripe.

31. The card and case of claim 30 wherein said two points form contact points for said card in an associated magnetic stripe reader.

32. A card for use with an electronic payment mechanism, said card having an upper surface and a lower surface, each of said surfaces defining a surface area on oppositely oriented front and back faces of said card, each of said surfaces being shaped with respect to a centerline along said surface, said card having a magnetic stripe along one of said surfaces, said magnetic stripe containing information that relates to said card, said magnetic stripe containing information relating to credit purchases by a person associated with said card, said card having a first card end with at least one arcuate portion formed of a first card radius, said card having a first card connecting portion on a first side of said card between said first end and said second end, said first card connecting portion having at least one convexly curved portion, said card having a second card connecting portion on a second side of said card between said first end and said second end, said second card connecting portion having at least one concavely curved portion.

33. The card of claim 32 wherein said second card radius is less than said first card radius.

34. An asymmetrical shaped card and case, comprising:
a card for use with an electronic payment mechanism, said card having an upper surface and a lower surface, each of said surfaces defining a surface area on oppositely oriented front and back faces of said card, each of said surfaces being asymmetrically shaped with respect to a vertical centerline along said surface,
said card having a magnetic stripe along one of said surfaces, said magnetic stripe containing information relating to credit purchases by a person associated with said card,
a case having upper and lower cover portions, said card being interposed between and removably connected to said upper cover portion and said lower cover portion, said card being movable between said upper and lower cover portions from a closed position in which a majority of the upper surface area of said card is enclosed by said cover portions to an open position in which a majority of the lower surface area of said card is exposed from cover portions to permit access to said card.

35. An asymmetrical shaped card and case, comprising:
a card for use with an electronic payment mechanism, said card having an upper surface and a lower surface, each of said surfaces defining a surface area on oppositely oriented front and back faces of said card,
said card having a first card end with at least one arcuate portion formed of a first card radius, said card having a second card end with at least one arcuate portion formed of a second card radius, said second card radius being less than said first card radius,
said card having a first card connecting portion on a first side of said card between said first end and said second end, said first card connecting portion having at least one convexly curved portion, said card having a second card connecting portion on a second side of said card between said first end and said second end, said second card connecting portion having at least one concavely curved portion,
a case having upper and lower cover portions, each of said upper and lower cover portions having a first cover end with at least one arcuate portion formed of a first cover radius and a second cover end with at least one arcuate portion formed of a second cover radius,
each of said upper and lower cover portions having a first cover connecting portion on a first side of said cover portion between said first cover end and said second cover end, said first cover connecting portion having at least one concavely curved portion, said concave curvature of said first cover connecting portion blending smoothly into said rounded portion of said first cover end,
each of said upper and lower cover portions having a second cover connecting portion on a second side of said cover portion between said first cover end and said second cover end, said second cover connecting portion having at least one convexly curved portion, said convex curvature of said second cover connecting portion blending smoothly into said rounded portion of said first end,
said card being interposed between and pivotally connected to said upper cover portion and said lower cover portion, said card being movable between said upper and lower cover portions from a closed position in which a majority of the upper surface area of said card is enclosed by said cover portions to an open position in which a majority of the lower surface area of said card is exposed from cover portions to permit access to said card,
said lower surface of said card includes a magnetic stripe that contains information relating to said card, said magnetic stripe extending between said arcuate first card end and said arcuate second card end, said magnetic stripe information being held on said stripe between said arcuate first card end and said arcuate second card end, said second card connecting portion extending between two points formed on said lower surface of said card, said two points forming a line therebetween that is substantially parallel to said magnetic stripe, said two points forming contact points for said card in an associated magnetic stripe reader.

36. A card for use with an electronic payment mechanism and an associated case, said card having an upper surface and a lower surface, each of said upper and lower surfaces defining a surface area on oppositely oriented front and back faces of said card, each of said upper and lower surfaces being shaped with respect to a centerline along said upper and lower surfaces, said card having a magnetic stripe along one of said upper and lower surfaces, said magnetic stripe containing information that relates to said card, said magnetic stripe containing information relating to credit purchases by a person associated with said card, said card having an aperture formed therein, said aperture being spaced from said centerline, said card being interposed between upper and lower cover portions of an associated case, said upper and lower cover portions connected by a pivot pin, said aperture engaging said pivot pin, said card being movable between said upper and lower cover portions from a closed position in which a majority of the upper and lower surfaces of said card are enclosed by said upper and lower cover portions to an open position in which a majority of the upper and lower surfaces of said card are exposed from said upper and lower cover portions to permit access to said card.

37. The card and associated case of claim 36 wherein said pivot pin comprises a key chain loop.

38. The card and associated case of claim 36 wherein at least one of said upper cover portion and said lower cover portion of said case includes a coarse material on at least a portion of its surface to create a frictional resistance to assist pivotal movement of said cover portion with respect to said card.

* * * * *